(12) United States Patent
Silvestrini (10) Patent No.: US 7,337,707 B2
(45) Date of Patent: Mar. 4, 2008

(54) THERMAL CONDITIONING SYSTEM HAVING CONTINUOUS CONVEYOR

(76) Inventor: Jesus Antonio Silvestrini, Messina 2613, 5544 Barrio Palmares, Godoy Cruz, Mendoza (AR)

( * ) Notice: Subject to any disclaimer, the term of this patent is extended or adjusted under 35 U.S.C. 154(b) by 144 days.

(21) Appl. No.: 10/928,327

(22) Filed: Aug. 27, 2004

(65) Prior Publication Data

US 2006/0042473 A1   Mar. 2, 2006

(51) Int. Cl.
*A23L 1/00*   (2006.01)

(52) U.S. Cl. .......................... 99/361; 99/365

(58) Field of Classification Search .......... 99/330–333, 99/339, 340, 352–355, 386, 444–450, 443 R, 99/443 C, 467–479, 483, 359–365; 198/535, 198/523, 562; 426/407, 523
See application file for complete search history.

(56) References Cited

U.S. PATENT DOCUMENTS

| | | | |
|---|---|---|---|
| 1,382,148 A | | 6/1921 | Walker |
| 1,445,196 A | | 2/1923 | Berry |
| 2,043,310 A | | 6/1936 | Thompson |
| 2,267,345 A | | 12/1941 | Thomas |
| 2,278,434 A | | 4/1942 | Fahey |
| 2,355,798 A | * | 8/1944 | Guthier ..................... 99/443 C |
| 2,468,794 A | | 5/1949 | Wilbur |
| 2,697,665 A | | 12/1954 | Olson |
| 3,491,679 A | * | 1/1970 | Kelly ........................... 99/331 |
| 3,583,171 A | * | 6/1971 | Flynn et al. .................. 62/266 |
| 3,856,135 A | * | 12/1974 | Hayakawa et al. ....... 198/860.5 |
| 3,982,481 A | * | 9/1976 | Console et al. ............... 99/477 |
| 4,532,857 A | * | 8/1985 | Sollich ........................ 99/483 |
| 4,556,572 A | * | 12/1985 | Kaufman et al. ........... 426/289 |
| 4,644,857 A | * | 2/1987 | Buller-Colthurst ........... 99/335 |
| 4,862,794 A | * | 9/1989 | Lapeyre et al. ........... 99/443 C |
| 4,887,524 A | * | 12/1989 | Ellis-Brown .............. 99/443 C |
| 4,966,072 A | * | 10/1990 | Ellis-Brown .............. 99/443 C |
| 5,072,663 A | | 12/1991 | Ellis-Brown |
| 5,075,120 A | * | 12/1991 | Leary et al. ................ 426/233 |
| 5,184,538 A | * | 2/1993 | Ledet .......................... 99/331 |
| 5,215,002 A | * | 6/1993 | Veltman ....................... 99/361 |
| 5,322,007 A | * | 6/1994 | Caridis et al. ............ 99/443 C |
| 5,458,261 A | | 10/1995 | Veltman |
| 5,526,736 A | | 6/1996 | Buriani et al. |
| 5,535,916 A | | 7/1996 | Veltman |
| 5,850,781 A | * | 12/1998 | Kuenen .................... 99/443 C |
| 5,960,703 A | | 10/1999 | Jara et al. |
| 6,862,979 B1 | * | 3/2005 | Silvestrini .................... 99/361 |

FOREIGN PATENT DOCUMENTS

GB   400129   10/1933

OTHER PUBLICATIONS

Starfrost—Helix brochure, undated.
Mecparma—CEE brochure, undated.

* cited by examiner

*Primary Examiner*—Timothy F. Simone
(74) *Attorney, Agent, or Firm*—Carlton Fields, P.A.

(57) ABSTRACT

A thermal conditioning system for heating and cooling cylindrical containers is disclosed, including a container heating apparatus and a container cooling apparatus, with the container cooling apparatus positioned generally coaxially below the heating apparatus, and in which are provided transport apparatus for supporting movement of containers through the heating chamber and the cooling apparatus.

14 Claims, 9 Drawing Sheets

THERMAL CONDITIONING SYSTEM HAVING CONTINUOUS CONVEYOR

BACKGROUND OF THE INVENTION

In the food processing and canning industry there has long been a requirement for heating and cooling the canned product. Various types of equipment have long existed for such thermal conditioning of containers, such as cans. Exemplary of such equipment is that shown in U.S. Pat. No. 1,445,196 to Berry and in U.S. Pat. No. 2,043,310 to Thompson. In such prior art equipment are passed along a first helical path within a heating chamber and are then moved to a separate cooling chamber along side the heating chamber. While this equipment performs its designed function, it is bulky and requires considerable space for installation, space which is frequently at a premium in a packing facility. Much of this prior art equipment has also presented difficulties in maintenance and cleaning due to the fixed housing for containing the cooking steam.

SUMMARY OF THE INVENTION

It is an object of the present invention to provide an apparatus for heating and cooling cylindrical containers that overcomes the disadvantages of the prior art equipment. It is a further object of the invention to provide such apparatus that is rugged and durable and provides for simplified operation and cleaning.

To achieve the foregoing, as well as other objects that will become apparent to those skilled in the art, a thermal conditioning system for heating and cooling cylindrical containers is disclosed and includes a container heating apparatus, a container cooling apparatus positioned generally below the heating apparatus and transport apparatus for supporting movement of containers through the heating chamber and the cooling apparatus. The container heating apparatus includes a heating chamber of generally cylindrical configuration with a generally vertical cylindrical axis and a predetermined vertical height, and that chamber includes a housing substantially enclosing the heating chamber and having a generally cylindrical configuration generally coaxial with the heating chamber axis, and a heated fluid introduced into that chamber for heating the containers within the heating chamber. The container cooling apparatus includes a cooling fluid sprayed directly onto the containers, whereby they may be cooled from their heated state. The transport apparatus includes a continuous conveyor structure extending from an entrance to the heating chamber, through the heating chamber and the cooling apparatus, to a container exit location and then back to the heating chamber entrance.

BRIEF DESCRIPTION OF THE DRAWINGS

To illustrate further the principles of this invention, two preferred embodiments will be described in detail, in which.

DESCRIPTION OF PREFERRED EMBODIMENTS

Figure 1:
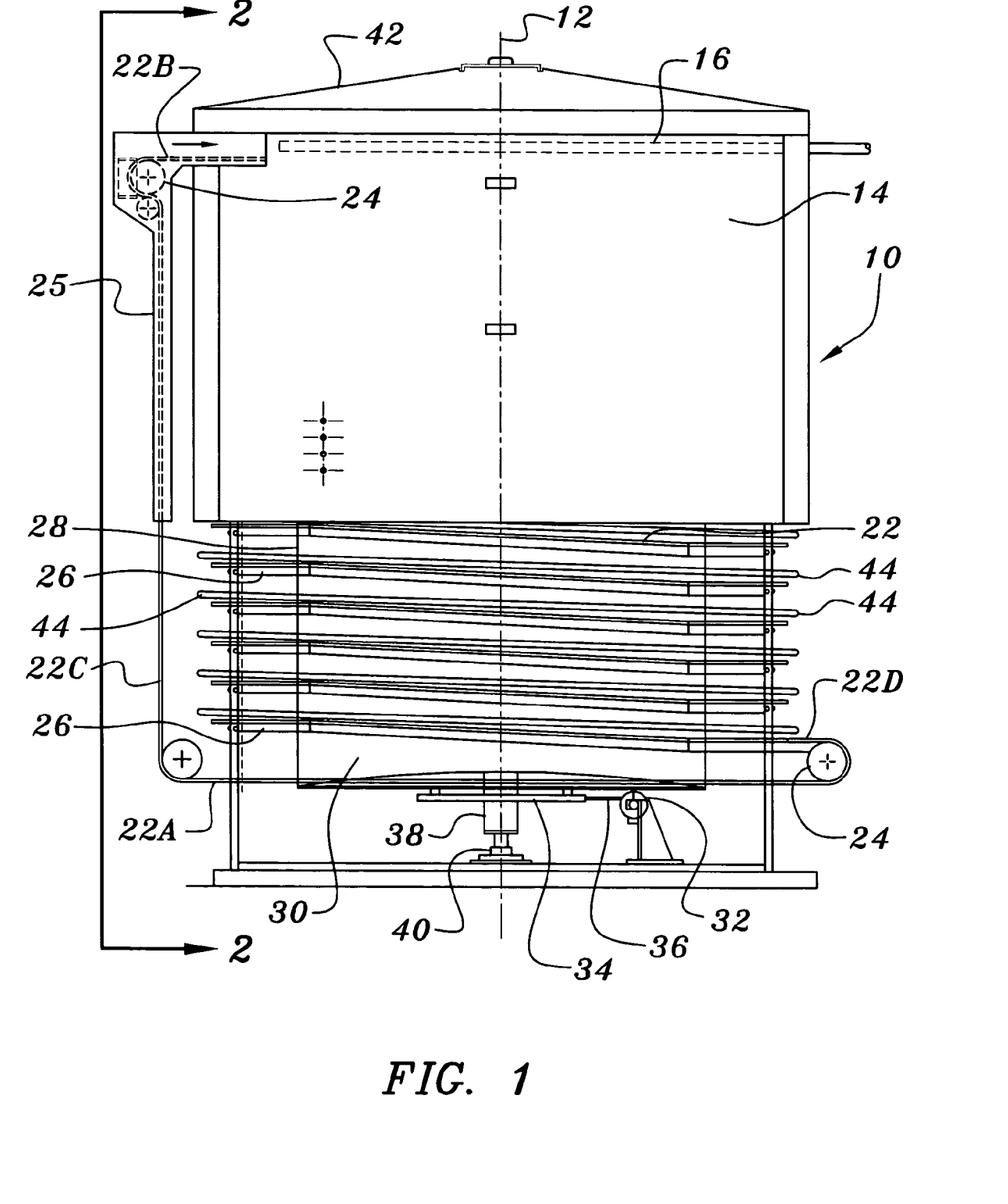
FIG. 1 is a side elevation of one embodiment of the thermal conditioning apparatus of this invention.
Figure 2:
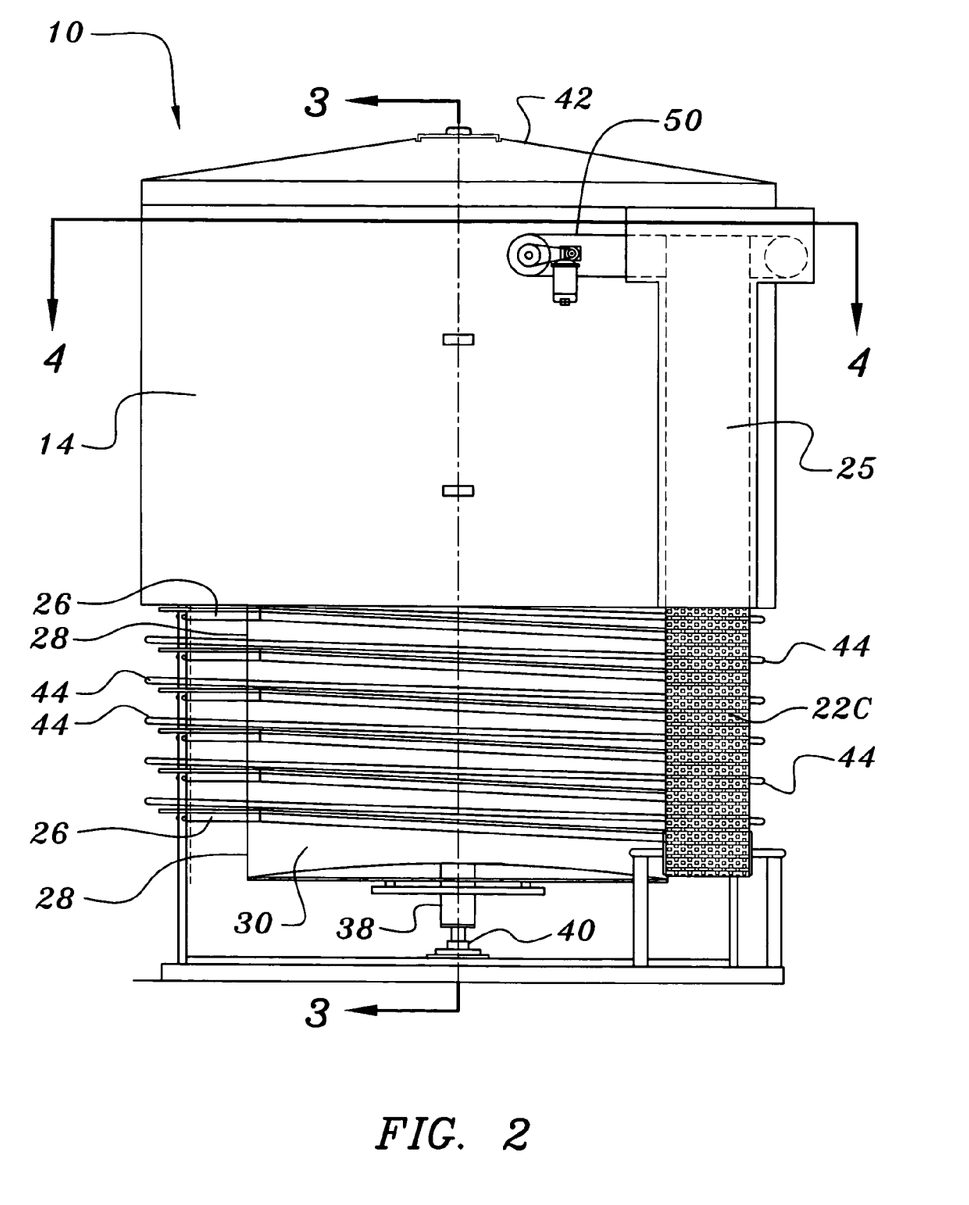
FIG. 2 is a side elevation of the apparatus in FIG. 1, taken along line 2-2 of FIG. 1.
Figure 5:
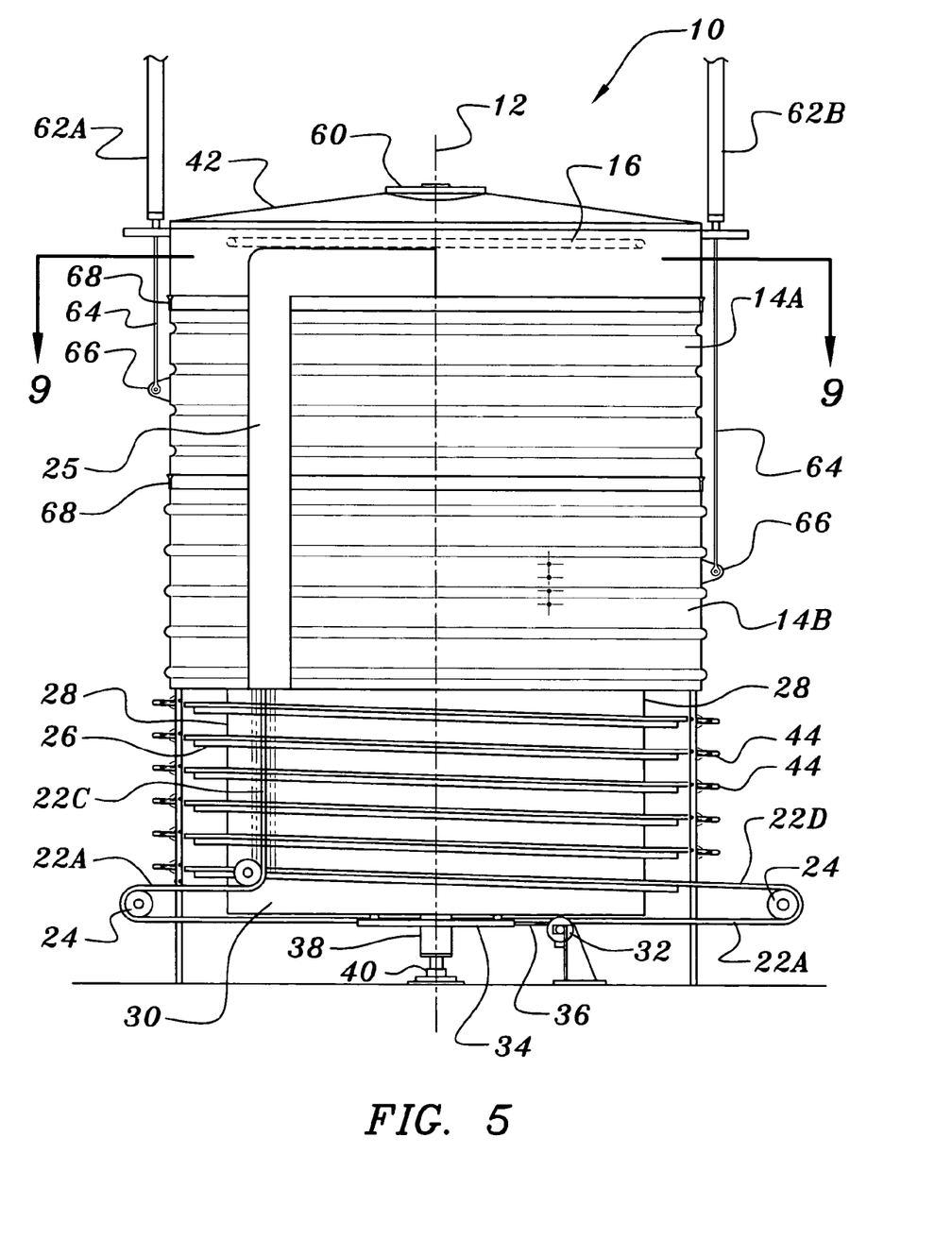
FIG. 5 is a side elevational view of a second preferred embodiment of the apparatus of this invention, with the two moveable cylindrical heating chamber sections in their raised position.

Two particularly preferred embodiments of the thermal conditioning apparatus of this invention are illustrated in the side elevational views of FIGS. 1 and 5, respectively. With respect to the embodiment of FIG. 1, the apparatus includes a heating chamber 10 of generally cylindrical configuration with a generally vertical axis 12 and a predetermined vertical height. The heating chamber comprises a housing 14 enclosing the heating chamber and likewise having a generally cylindrical configuration that is generally coaxial with the heating chamber axis 12. This heating chamber is provided with a source, suitably entry and distribution tube 16, for introducing a heated fluid, such as steam, into the chamber. This tube 16 may conveniently be connected to conventional steam generators (not shown), to provide a supply of this heated fluid for heating chamber 10.

The apparatus of this system also includes a conveyor system for introducing cylindrical containers into the heating and cooling chamber, and for removing the heated and then cooled containers from this apparatus. These containers, while preferably cylindrical, may have any desired cross section, such as round, oval, square or the like, the term "cylindrical" being used in the geometrical sense. As shown in FIGS. 1, 2, 3, and 4, there is provided a continuous conveyor 22, suitably in the form of a plurality of links, such as in a chain, that may both bend about an axis parallel to the surface of the conveyor to pass over rollers 24 (FIG. 1) and may bend in a direction about an axis normal to the conveyor, to track about a helical path as shown in FIG. 4. Also, as shown in FIG. 1, this conveyor 22 includes a first portion 22A located generally adjacent to the lower most portion of this thermal conditioning system, a second portion 22B located generally adjacent to the uppermost portion of the heating chamber, and a third portion 22C extending upwardly from the first portion 22A to the second portion 22B. An enclosure 25 may suitably enclose the conveyor second and third portions and communicate with the interior of the vertically upper portion of the heating chamber 10.

As shown in FIG. 4, when the conveyor 22 enters the heating chamber 10 it is deflected transversely into a generally circular pattern. Preferably, the transport conveyor 22, upon entering the heating chamber 14, engages helical flights 26 extending generally radially outwardly from the cylindrical sidewall 28 of drum 30. These flights extend sufficiently far outwardly to receive and support the conveyor 22. This drum 30 has a cylindrical sidewall 28 that is generally coaxial with the drum central axis, which preferably is coaxial with the central axis 12 of the system. The helical flights 26 of the drum engage the conveyor 22 in a helical path extending around the periphery of that drum sidewall 28 from a point adjacent the uppermost portion of the drum sidewall to a point adjacent the lowermost portion of the sidewall, as shown in FIG. 1.

A suitable drive mechanism, which conveniently may be a geared electric motor 32, is connected with suitable structure, such as belts or chains 36 to structure, such as pulley or sprocket 34 affixed to the drum. A shaft 38 is preferably affixed to the drum 30 and mounted in a suitable bearing 40 for rotation about its central, general vertical axis. By the engagement of the conveyor 22 with the flights 26 extending outwardly from the sidewall of the drum 30, the driving rotation of the drum about its vertical axis is synchronized with the movement of the conveyor 22 along the helical flights defining a helical path around such drum.

As shown in FIG. 1, the heating chamber 10 is generally enclosed by the housing 14. Preferably located in the upper portion of that housing 14 is heated fluid distribution system 16, which suitably comprises a pipe with apertures to disperse the heated fluid, such as steam, flowing through that distribution system. This portion of the apparatus is also shown in the top view of FIG. 4. That distribution system 16 is preferably connected to a source of the heated fluid, which is not shown.

Also as shown in the illustrations, the heating chamber housing 14 also comprises a generally circular top portion 42 for enclosing the top of the heating chamber, in cooperation with the cylindrical sidewalls 14 of the housing 14. These cylindrical sidewalls extend a predetermined distance downwardly from that top portion 42. A relatively close fit between the interior of the sidewalls of the housing portion 14 and the helical flights 26 extending outwardly from the drum 30 substantially encloses the heating portion of this thermal conditioning system.

Positioned below the bottom of the cylindrical sidewalls of the heating chamber is the container cooling apparatus, which suitably may be open to the environment. To assist in cooling containers being carried along the conveyor 22 is a structure, suitably in the form of a helically extending tube 44, extending outside the conveyor 22 and helical flights 26 and preferably including a plurality of nozzles or apertures through which a cooling spray, such as water, may be directed on containers carried on the conveyor 22. This cooling apparatus 44 serves to cool the previously heated containers to the desired temperature before discharge from the horizontal portion 22D of the conveyor.

Figure 3:
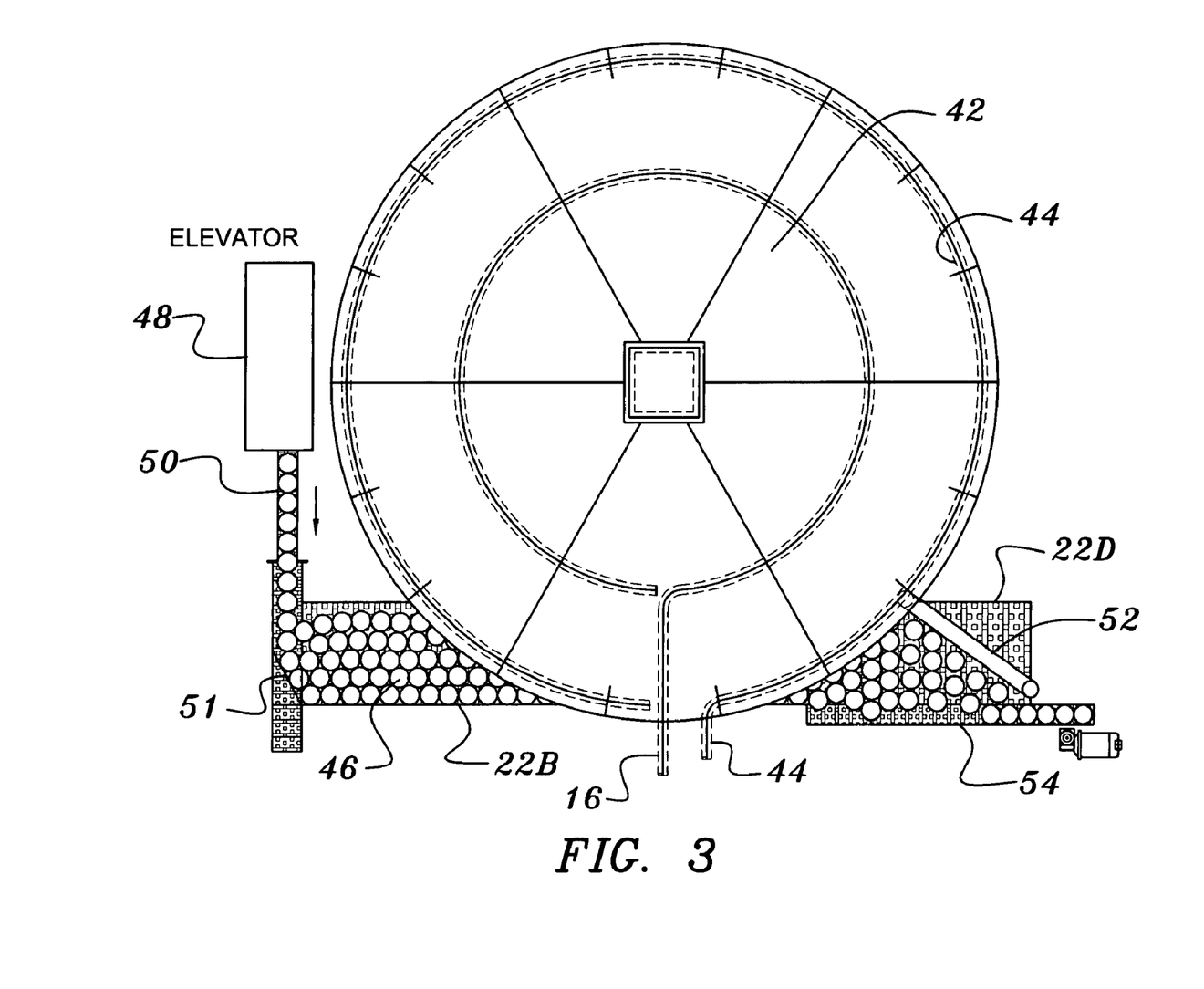
FIG. 3 is a top plan view of the apparatus of FIG. 2.
Figure 4:
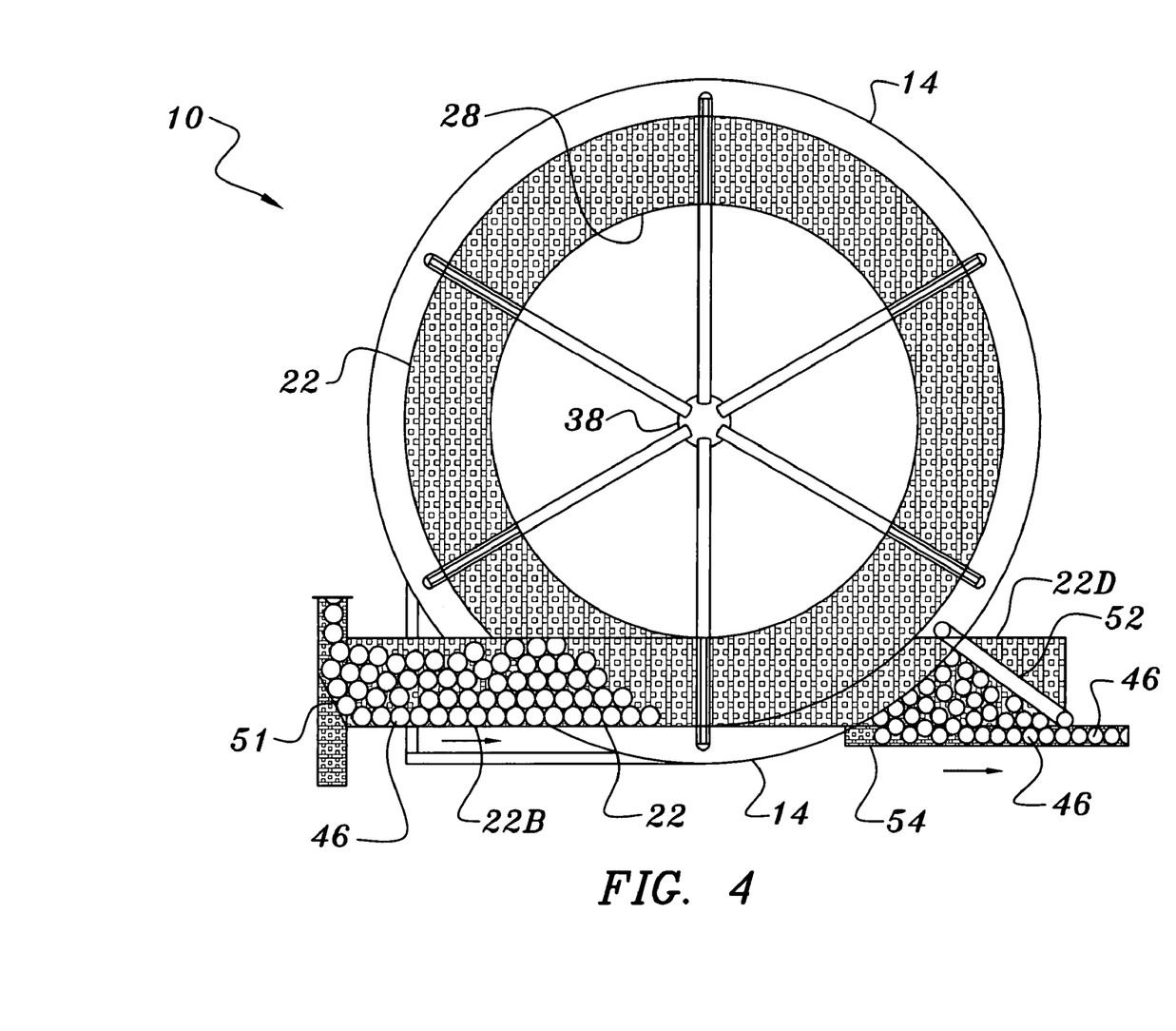
FIG. 4 is a top sectional plan view of the apparatus of FIG. 1, taken along line 4-4 of FIG. 2.

As shown most clearly in the top views of FIGS. 3 and 4, containers 46 to be introduced into the thermal conditioning system of this invention may suitably be lifted to the entrance portion of the conveyor 22B by a suitable elevator 48 and then carried, suitably in an upright position with their cylindrical axis generally vertical, by connecting conveyor 50 to the horizontal entrance portion 22B of the main conveyor. The containers 46 entering on this connecting conveyor 50 may then be introduced on to the main conveyor 22B either 1, 2, 3, or more at a time, as desired, by any conventional means, such as a deflector 51, so that the containers may proceed through the apparatus at the desired rate of throughput, as shown in FIGS. 3 and 4. As best shown in FIG. 4, the exit conveyor portion 22D carries the containers to an appropriate structure, such as angled deflector 52, that deflects the cans on to a removal conveyor 54, suitably in single file, for subsequent processing or packaging. By controlling the volume and temperature of the heated fluid introduced into the heating chamber and the rate of movement of the containers through the heating apparatus, the containers may be heated to a desired temperature, for processing the contents of the containers. Then, by moving the containers out of the heating chamber and into the cooling apparatus, the heated containers are then cooled to a desired temperature before further handling.

FIGS. 5-10 illustrate another preferred embodiment of this invention. As many of the structural features of this second embodiment are comparable to, if not substantially the same as, the components of the previously described embodiment, the same reference numbers will be used for comparable components in this embodiment as were used with that previously described embodiment, and the description will not be repeated here.

It may be noted that, if desired, the conveyor system 22 for this embodiment may be configured to move the cylindrical containers 46 through the system with their axes generally horizontal instead of vertical. Of course, it is a mere matter of choice, as either orientation can be accommodated.

In this second embodiment, as well as the first embodiment, there is provided a manhole opening 60, suitably in the circular top portion 42 of the heating chamber housing. This manhole 60 permits access to the uppermost portions of the apparatus.

The housing 14 enclosing the heating chamber 10, and specifically, the cylindrical sidewalls, of this embodiment may suitably be of a different configuration from that of the previous embodiment. In this embodiment the cylindrical sidewalls may either be unitary or comprised, as shown, of a plurality of axially adjacent cylindrical sections. In this embodiment two such sections are used, although the number is a matter of choice. These sections 14A and 14B, are supported for selective axial movement both away from and into engagement with the top portion, whereby the sidewalls may be selectively axially displaced away from the top portion. These sidewalls are supported by suitable actuators, which may conveniently be hydraulic or pneumatic cylinders 62 affixed to the top portion 42, with linearly movable shafts 64 extending from them, with the outermost ends of those shafts connected by suitable means, such as a clevis 66, to the cylindrical sidewalls. In the embodiment shown in FIGS. 5-7, it is convenient to have three cylinders 62A engaging and supporting the upper cylindrical sidewall portion 14A, and three other cylinders 62B supporting the lower cylindrical sidewall portion 14B.

Figure 6:
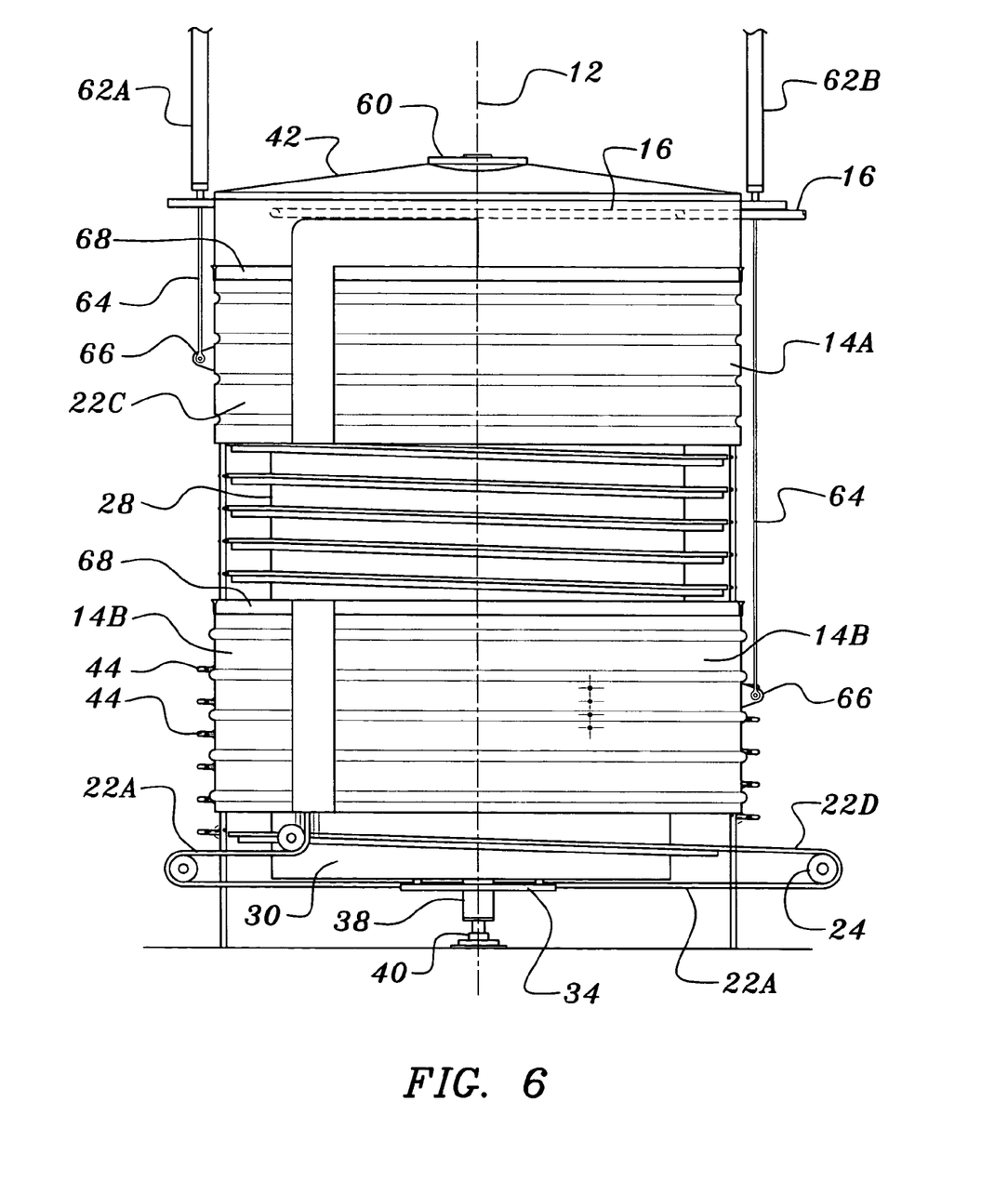
FIG. 6 is a side elevation of the equipment of FIG. 5, but with a lower heating chamber housing section in its lowered position.
Figure 7:
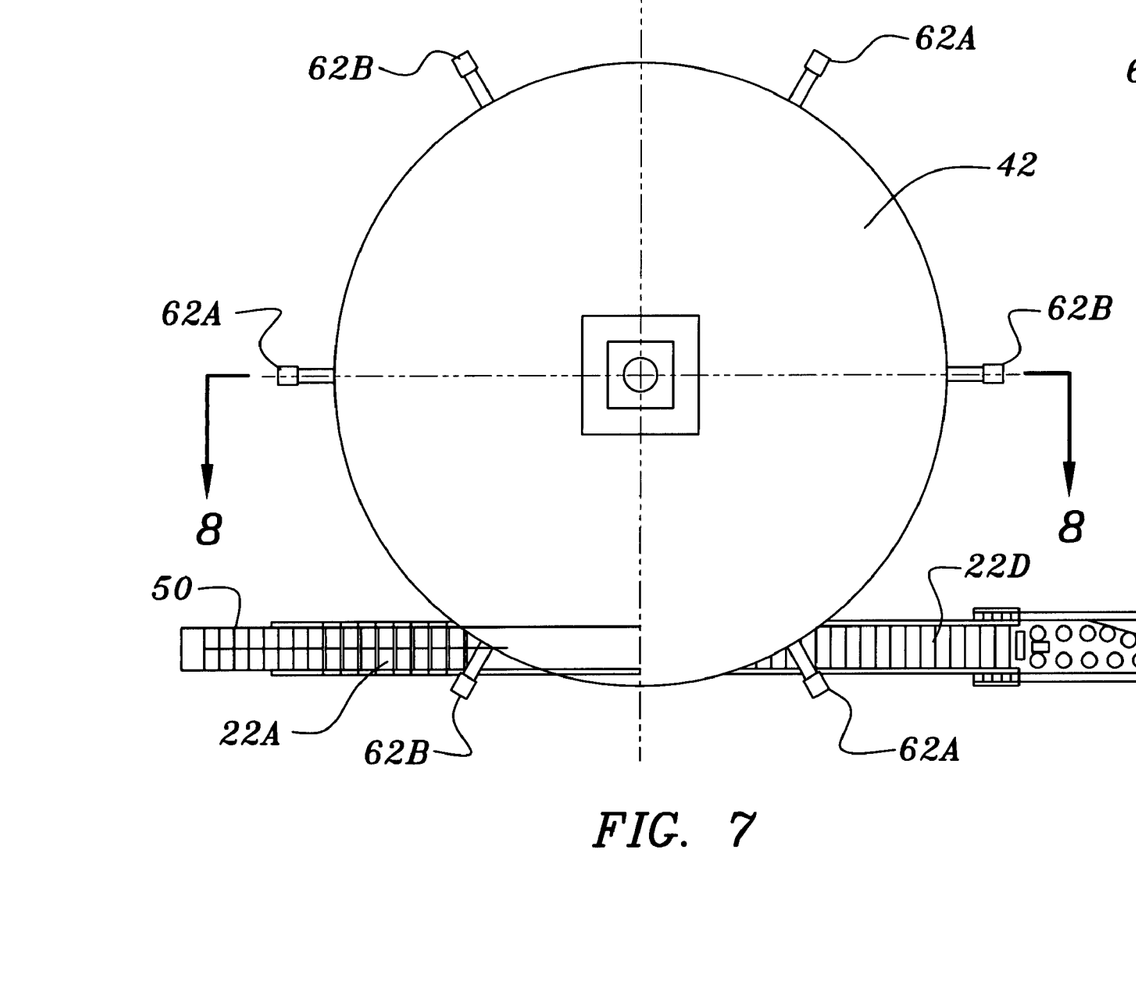
FIG. 7 is a top plan view of the apparatus of FIG. 5.
Figure 8:
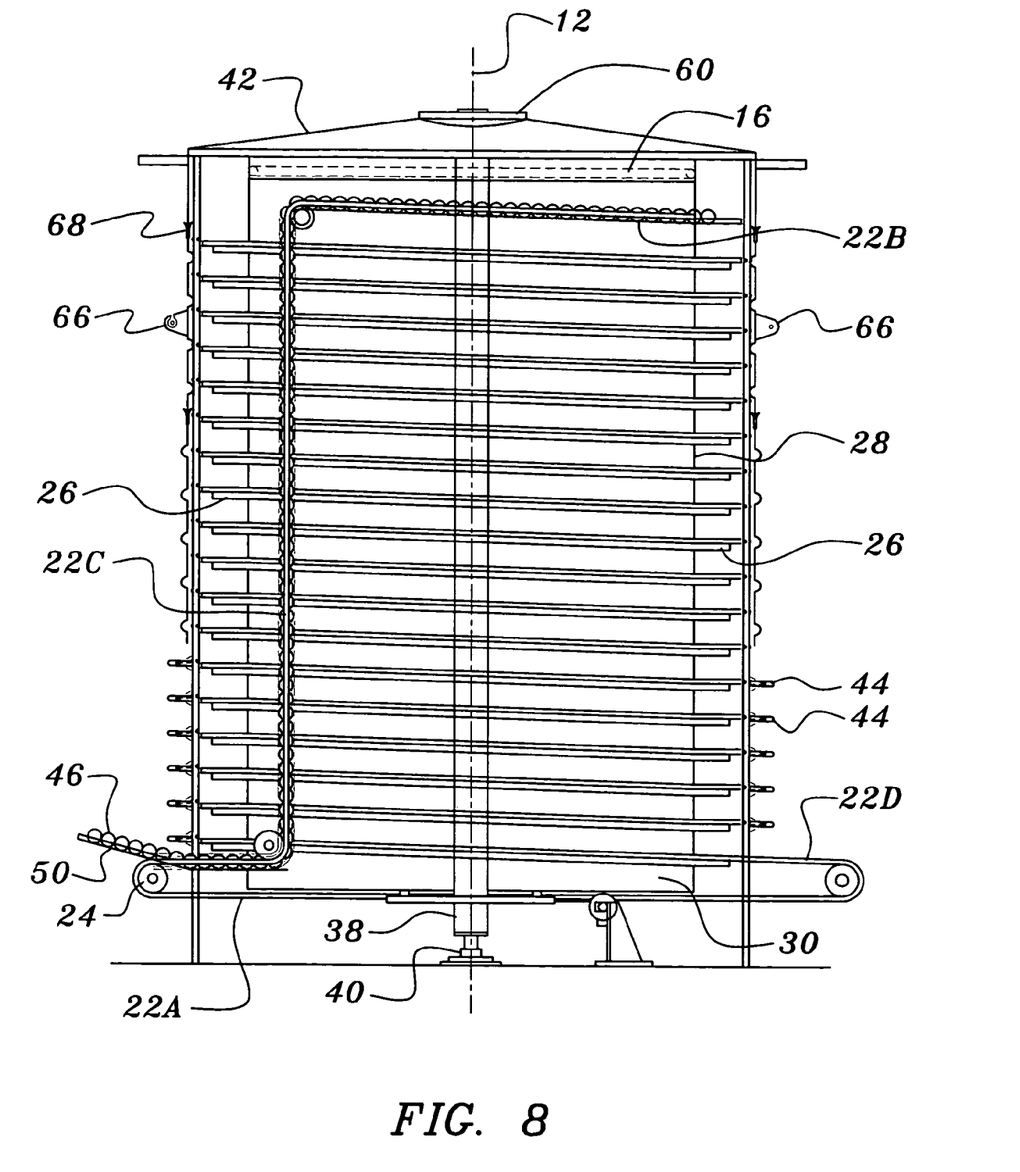
FIG. 8 is a sectional elevational view of the apparatus of FIG. 7, taken along line 8-8 of FIG. 7.
Figure 9:
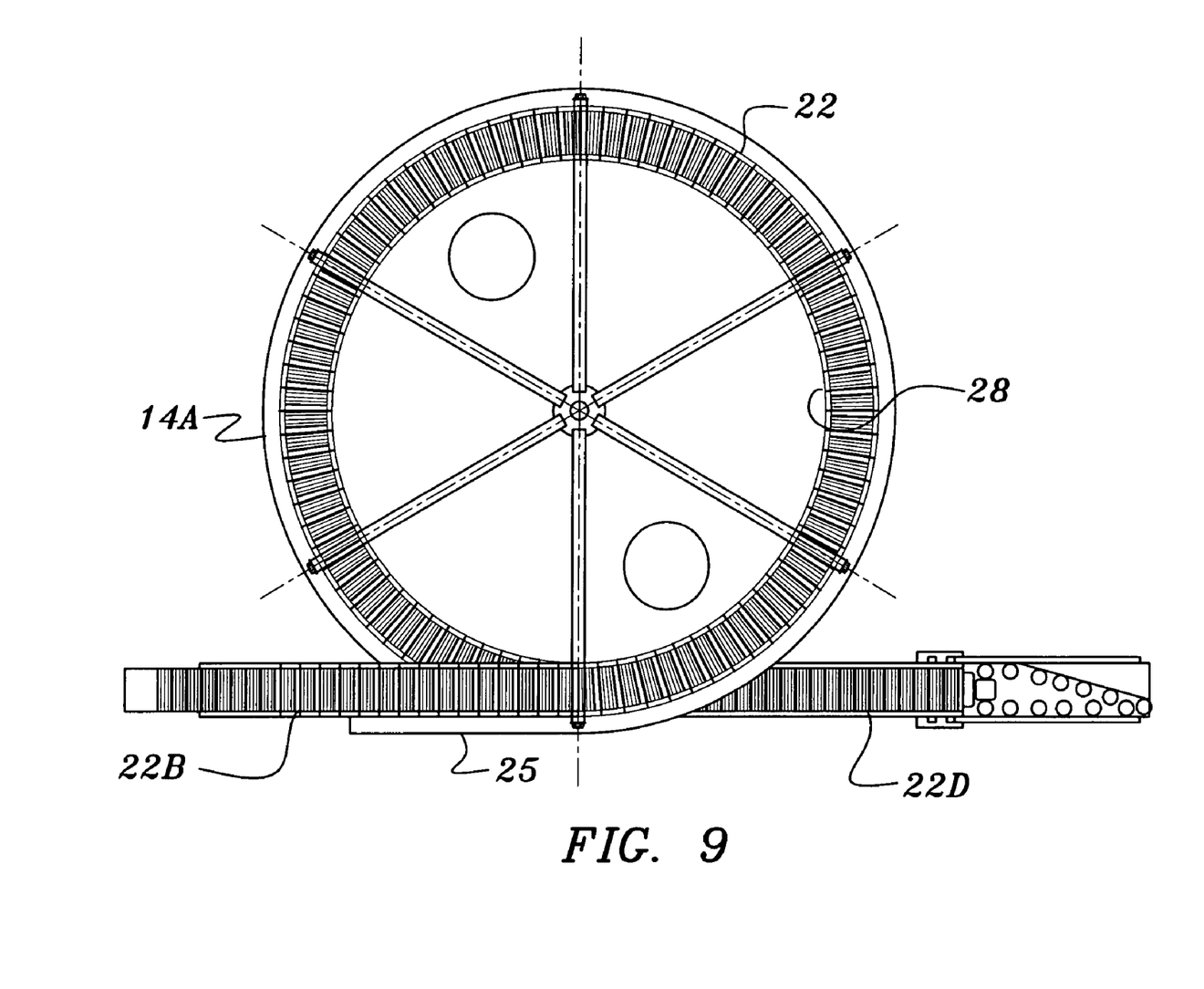
FIG. 9 is a top sectional plan view of the apparatus of FIG. 5, taken along line 9-9 of FIG. 5.

FIG. 5 illustrates both of the sidewall portions 14A and 14B in their raised position, forming the housing for the heating chamber as it is conventional used. In FIG. 6 is illustrated the extension of cylinder 62B, thus effecting the lowering of the cylindrical sidewall portion 14B to provide for access to the interior of the heating chamber normally covered by that cylindrical sidewall portion 14B. In this manner, maintenance and cleaning may easily be effected on the interior of the apparatus. While not shown, extension of the cylinder 62A would, correspondingly, serve to lower the upper cylindrical sidewall portion 14A away from its engagement with the housing top portion 42, to provide access to the upper portions of the heating chamber, normally covered by that upper cylindrical sidewall portion 14A.

Figure 10:
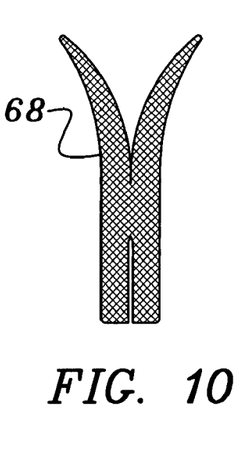
FIG. 10 is a cross-section of an embodiment of a sealing gasket used in the apparatus of FIG. 5.

To provide for sealing engagement between the upper cylindrical sidewall portion 14A and the housing top portion 42, and between lower cylindrical sidewall portion 14B and upper sidewall portion 14A, there is preferably provided a seal 68, a cross section of which is shown in FIG. 10. This seal, suitably formed of a heat-resistant and resilient synthetic resin and interposed between the housing top portion and the upper portion of the cylindrical sidewall, and between adjacent cylindrical sidewall sections, provides for sealing engagement when the adjacent sections are in mutual engagement, to assist in retention of the heating fluid within the heating chamber.

While the foregoing describes two preferred embodiments of the invention, it is to be understood that these embodiments are illustrative only of the principles of the invention and are not to be considered limitative thereof, as numerous other embodiments and variations, all within the scope of the invention, will readily occur to those skilled in the art. Accordingly, the scope of this invention is to be limited solely by the claims appended hereto.

What is claimed is:

1. A thermal conditioning system for heating and cooling cylindrical containers comprising
    container heating apparatus comprising
        a heating chamber of generally cylindrical configuration with a generally vertical cylindrical axis and a predetermined vertical height, said chamber including
            a housing enclosing said heating chamber and having a generally cylindrical configuration generally coaxial with said heating chamber axis, and
            a heated fluid introduced into said chamber for heating said containers within said heating chamber;
    container cooling apparatus positioned generally coaxial with and below said heating chamber, said cooling apparatus including a cooling fluid spray directed onto said containers;
    transport apparatus for supporting movement of said containers through said heating chamber and said cooling apparatus, said transport apparatus comprising;
        a continuous conveyor structure entending from an entrance to said heating chamber, through said heating chamber and said cooling apparatus, to a container exit location, and then back to said heating chamber entrance.

2. The thermal conditioning system of claim 1 wherein said transport apparatus further comprises a drum having a generally vertical central axis and engaging said conveyor structure adjacent said heating chamber entrance and supporting said conveyor structure during said movement through said heating chamber and said cooling apparatus to a point generally proximal said container exit.

3. The thermal conditioning system of claim 2 wherein said drum has a cylindrical sidewall generally coaxial with said drum central axis, and said drum engages said conveyor in a helical path extending around the periphery of said drum sidewall from a point adjacent the uppermost portion of said sidewall to a point adjacent the lowermost portion of said sidewall.

4. The thermal conditioning system of claim 2 further comprising a drive mechanism for driving rotation of said drum about said vertical axis in synchronization with movement of said conveyor.

5. The thermal conditioning system of claim 3 wherein said drum is driven for rotation about said vertical axis in synchronization with movement of said conveyor along said helical path extending around said periphery of said drum.

6. The thermal conditioning system of claim 1 wherein said conveyor structure includes a generally horizontal entrance portion for receiving said containers for introduction into said heating chamber, and a generally horizontal container exit portion for removing said containers from said cooling apparatus.

7. The thermal conditioning system of claim 6 wherein said conveyor structure further comprises a first portion extending generally horizontally from a point outside said heating chamber entrance and a second portion extending generally horizontally inside said heating chamber.

8. The thermal conditioning system of claim 7 wherein said conveyor structure first portion is located generally adjacent the lowermost portion of said system and said conveyor second portion is located generally adjacent the uppermost portion of said heating chamber, and wherein said conveyor structure further comprises a third portion extending upwardly from said first portion to said second portion.

9. The thermal conditioning system of claim 8 further comprising an enclosure enclosing said conveyor second and third portions and communicating with the interior of the vertically upper portion of said heating chamber.

10. The thermal conditioning system of claim 1 wherein said heating chamber housing comprises
    a generally circular top portion for enclosing the top of said heating chamber, and
    generally cylindrical side walls engaging said top portion and extending a predetermined distance from said top portion.

11. The thermal conditioning system of claim 10 wherein said cylindrical side walls are supported for selective axial movement both away from and into engagement with said top portion, whereby the sidewalls may be selectively axially displaced away from the top portion.

12. The thermal conditioning system of claim 11 wherein said cylindrical side walls comprise a plurality of axially adjacent cylindrical sections, with each said section being supported for selective axial movement relative to an adjacent said section and relative to said top portion.

13. The thermal conditioning system of claim 11 further comprising a seal interposed between said housing top portion and said cylindrical side wall to provide for sealing engagement between said top portion and said side wall when said top portion and said side wall are in engagement to assist in retention of said heating fluid within said heating chamber.

14. The thermal conditioning system of claim 12 further comprising a seal interposed between said housing top portion and said cylindrical side wall to provide for sealing engagement between said top portion and said side wall when said top portion and said side wall are in engagement, and seals interposed between adjacent said cylindrical side wall sections to provide for sealing engagement when said adjacent sections are in mutual engagement to assist in retention of said heating fluid within said heating chamber.

* * * * *